United States Patent [19]

Cox

[11] Patent Number: 4,789,788
[45] Date of Patent: Dec. 6, 1988

[54] OPTICALLY PUMPED RADIATION SOURCE

[75] Inventor: Philip R. Cox, Manchester, Tenn.

[73] Assignee: The Boeing Company, Seattle, Wash.

[21] Appl. No.: 3,552

[22] Filed: Jan. 15, 1987

[51] Int. Cl.⁴ .............................................. G01N 21/24
[52] U.S. Cl. ............................ 250/504 R; 250/493.1; 250/503.1
[58] Field of Search ............. 250/503.1, 493.1, 504 R, 250/495.1, 228; 356/236

[56] References Cited

U.S. PATENT DOCUMENTS

| | | | |
|---|---|---|---|
| 3,138,697 | 6/1964 | Banca et al. | 250/504 R |
| 3,920,336 | 11/1975 | Sackett | 356/201 |
| 4,317,042 | 2/1982 | Bartell | 250/504 R |
| 4,551,628 | 11/1985 | Grossman | 250/503.1 |

FOREIGN PATENT DOCUMENTS 0222751  11/1985  Japan ................................. 356/236

Primary Examiner—Craig E. Church
Assistant Examiner—Paul A. Guss
Attorney, Agent, or Firm—Finnegan, Henderson, Farabow, Garrett & Dunner

[57] ABSTRACT

An apparatus for converting monochromatic laser radiation to polychromatic Planckian radiation. A spherical chamber specularly integrates a laser beam which is focused through an entrance aperture. A source cavity in the integrating chamber absorbs the laser energy and produces polychromatic Planckian radiation.

14 Claims, 1 Drawing Sheet

OPTICALLY PUMPED RADIATION SOURCE

BACKGROUND OF INVENTION

The present invention relates to a radiation source; and more particularly, to an improved apparatus and method for generating polychromatic radiation in the infra-red and near infra-red wavelengths.

There are several types of instruments that measure the different characteristics of radiant energy. For example, the intensity of radiant energy is typically measured by a radiometer. The emission and wavelengths of electromagnetic radiation are produced and measured by the well known spectrometer; and a narrow corner of the spectrum of electromagnetic radiation is typically isolated by an instrument referred to as a monochrometer.

Since one of the characteristics of radiant energy is a function of the temperature of an object, and different materials exhibit specific radiant energy characteristics at various temperatures; measuring instruments of this type are particularly useful for remote measuring and recognition. For example, these instruments are particularly useful for space applications, where it is desired to determine the temperature and radiant energy characteristics of a remote vehicle; and to recognize a specific space object as it rapidly changes temperature upon reentry into the atmosphere.

In order to be effective, however, particularly in attempting to establish the identity of a particular object in space, the signature recognition of the radiant energy must be precise. This is extremely important during reentry to the atmosphere where the space object is subjected to rapidly changing temperatures. Therefore, this type of instrument requires calibration in accordance with a reliable standard for all temperatures and materials to be measured. It is customary to calibrate radiation measuring devices for the infra-red and near infra-red regions by using a source of radiation in accordance with the "black body" theory. A black body is defined as an ideal body that reflects none of the radiation falling upon it, thus theoretically having an absorption rate of 100%. In actual practice, a radiator that emits over ninety-five percent of impinging energy, is commonly referred to as a black body; and is said to generate Planckian radiation.

When a black body is heated, the character of the radiation emitted by it, including flux density and spectral energy, varies as a function of temperature, in accordance with well known physical laws. For example, the total emission of radiant energy of a black body takes place at a rate expressed by the Stefan-Boltzman or fourth power equation, while the spectral energy distribution conforms to Planck's Equation. Thus, if the emissivity and temperature of an infra-red radiation source are known, the Planckian equation may be used to properly calculate the power and spectrum of such radiation source. In other words, an accurate calculation may be made as to how much power, and at what wavelength, such a radiation source contains. The Planckian equation may be expressed as follows:

$$E\lambda(T) = \epsilon \frac{C_1}{\lambda^5 (e^{C_2/\lambda T} - 1)}$$

where $E\lambda(T)$ is the monochromatic emissive power of a body at temperature T.

$T$ = temperature of the body.

$\lambda$ = wavelength at which the power is being calculated.

$C_1$ = calculation constant ($374.15 \times 10^{-18}$ Wm$^2$)

$C_2$ = calculation constant ($14.388 \times 10^{-3}$ mK)

$\epsilon\lambda$ = emissivity of the body at $\lambda$.

The above equation calculates the power emitted by the body for each wavelength. To calculate the total power emitted by the body in question, the function must be integrated, or $$\int E\lambda(T)d\lambda = \int \epsilon\lambda \frac{C_1}{\lambda^5 (e^{C_2/\lambda T} - 1)}$$

which is equal to $\gamma T^4$, the Stefan Boltzman Law.

Experimentally, a black body may be considered an almost completely closed cavity in an opaque body, such as a jug. In the laboratory, a black body is usually made from an elongated cylinder that is blackened on the inside and completely closed, except for a narrow slit in one end. Radiation closely resembling black body or Planckian radiation escapes from the slit when the cylinder is heated. It is customary to heat these enclosures electrically and to vary the temperature as you would a conventional resistance heating device.

Such a radiation source was limited as a radiation standard for the calibration of radiation measuring instruments, for example, in that it was difficult to provide a uniform temperature to the enclosure, thus hindering the generation of uniform radiant energy. Further, it was difficult to heat the enclosure to the temperatures required in space applications. Finally, it was a practical impossibility to rapidly change the temperature of the enclosure in order to provide a standard corresponding to the real time simulation of changing environmental conditions, such as atmospheric reentry. Such a radiation source required substantial mathematical interpretation and theoretical calculations for calibrating radiant energy measuring devices at high and rapidly changing temperatures up in the range of 3000 Kelvins or more.

SUMMARY OF INVENTION

It is intended by the present invention to provide an improved apparatus and method that generates uniform polychromatic radiant energy in the infra-red and near infra-red regions primarily for use in calibrating radiation measurement instruments.

It is further intended by the present invention to provide an improved apparatus and method for providing a radiation source that generates infra-red radiation over a large temperature range, such as in the neghborhood of 3400 Kelvins, for example.

It is still further intended by the present invention to provide an improved apparatus and method of providing radiation having an emmissivity that includes Planckian radiation that responds quickly to power input changes resulting in the ability to simulate rapid radiant energy changes.

Additional advantages of the present invention will be set forth in the description which follows; and in part will be obvious from the description, or may be learned by practice of the invention. The advantages of the invention may be realized and attained by means of the instrumentalities and combinations, particularly pointed out in the appended claims.

To manifest the intent and in accordance with the purposes of the invention, as embodied and broadly described herein, the apparatus of the invention for generating polychromatic radiation, comprises a hollow member having entrance aperture means, output aperture means, and an internal reflective surface portion for specularly integrating monochromatic laser radiation entering the member through the entrance aperture means. Radiation absorptive means are mounted within the member and form a cavity surrounding the output aperture means for absorbing laser energy from the hollow member. The absorptive means has a total absorbtion substantially greater than the reflective internal surface. The absorptive means has a surface area dimensioned relative to the output aperture means to provide a polychromatic radiation emissivity having a selected emissivity upon the absorption of integrated laser radiation in the cavity.

Preferably, as embodied and broadly described herein, the apparatus of the invention for generating polychromatic radiation, comprises a first chamber means having entrance aperture means and a second aperture means, the first chamber means having a reflective surface for specularly integrating monochromatic laser radiation entering the chamber through the entrance aperture means; a second chamber means having a third aperture means disposed within the first chamber means, the second chamber means having an absorptive external and internal surface for absorbing laser energy in the first chamber means. The exterior surface of the second chamber means surrounding the third aperture means is attached to the the surface of the first chamber means surrounding the second aperture means for enclosing the external surface of the second chamber means in the first chamber means and to form an output aperture for effecting communication of the interior of the second chamber means with the exterior of the first chamber means. The second chamber means and the output aperture means are dimensioned relative to each other to provide a polychromatic radiation having a selected emissivity upon the absorption of the integrated laser radiation in the second chamber means.

In another aspect, the invention comprises a method of converting monochromatic laser radiation to polychromatic radiation, comprising focusing a laser beam through an aperture to a reflective interior of an enclosed chamber for specularly integrating the laser radiation; absorbing the integrated radiation through a cavity-forming surface area within the enclosed chamber having a mouth communicating exteriorly of the chamber with a dimension relative to the surface area to convert the absorbed radiation to polychromatic radiation having a selected emissivity and varying the power of the laser radiation to control the temperature of the absorbing surface area for producing corresponding wavelengths at the cavity mouth.

The accompaying drawings, which are incorporated in and constitute a part of this specification, illustrate the present preferred embodiments of the invention and, together with the description, serve to explain the principles of the invention.

DESCRIPTION OF PREFERRED EMBODIMENTS

Figure 1:
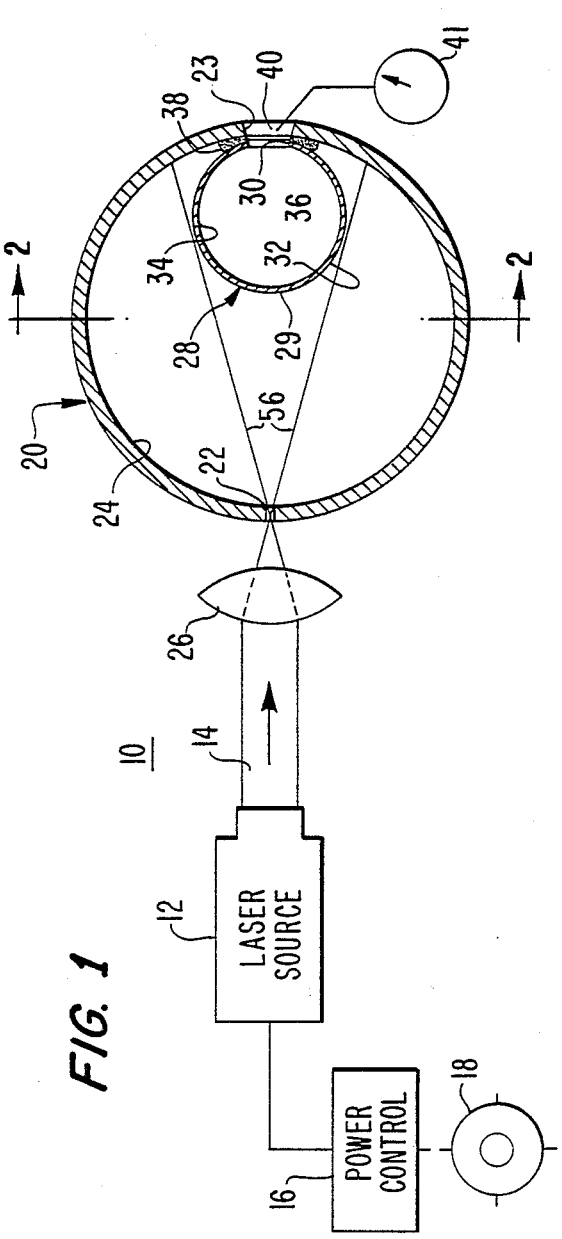
FIG. 1 is a schematic representation of an apparatus according to one present preferred embodiment of the invention, illustrating in cross section, source specular integrating and cavity spheres thereof.

Reference will now be made in detail to the present preferred embodiments of the invention, examples of which are illustrated in the accompaying drawings. Referring to FIG. 1, an apparatus for generating Planckian radiation from a monochromatic laser radiation source is generally referred to at 10. A conventional laser source, represented schematically at 12, which outputs a monochromatic beam 14, is used in the present invention. The power of output beam 14 is varied by a conventional laser power control apparatus 16, which may ave a manually adjustable control knob 18 graduated in temperature units, such as Kelvins, or percentages of maximum laser power, for example.

In accordance with the present invention, there is provided a hollow member or first chamber means having entrance aperture means, output aperture means, and an internal reflective surface portion for specularly integrating monochromatic laser radiation entering the member or first chamber through the entrance aperture means. As embodied herein, and referring to FIGS. 1 and 2, first chamber means is a hollow member 20, which is preferably spherical in configuration, and has an entrance aperture 22 and a diametrically opposed output or second aperture 23. Spherical member 20 may be made of plastic or aluminum and has a highly polished mirror-like interior surface 24 for specularly integrating laser energy. Laser beam 14 is focused by conventional optics represented by lens 26 so that beam 14 converges at entrance aperture 22. Entrance aperture 22 has a diameter that corresponds to what is commonly termed a pinhole.

The invention includes radiation absorptive means mounted within the member and forming a cavity surrounding the output aperture means for absorbing laser energy from the hollow member, the absorptive means having a total absorbtion substantially greater than the reflective internal surface. The absorptive means has a surface area dimensioned relative to the output aperture means to provide a polychromatic radiation emissivity substantially corresponding to Planckian radiation upon the absorption of integrated laser radiation in the cavity. As illustrated in the embodiment of FIG. 1 herein, the radiation absorptive means comprises hollow spherical member 28 defined by wall 29 made of a radiation absorbent material, such as cast iron, carbon, or tungsten, and having a third aperture 30 therein. Wall 29 of second chamber 28 which is configured in the form of a cavity has an external absorbent surface 32 and an internal absorbent surface 34. Member 28 is fastened inside hollow member 20 by attaching portion 36 of external surface 32 surrounding peripheral edge of aperture 30 to portion 38 of internal surface 24 surrounding aperture 23 of member 20, in a conventional manner such as by brazing or bonding, depending on the materials used.

Such a construction provides for complete enclosure of external surface 32 of member 28 by spherical member 20. Apertures 23 and 30 cooperate to form an output aperture 40. A high temperature gauge 41 may be connected in a well known manner to source cavity 28 for determining the temperature of the cavity.

Figure 2:
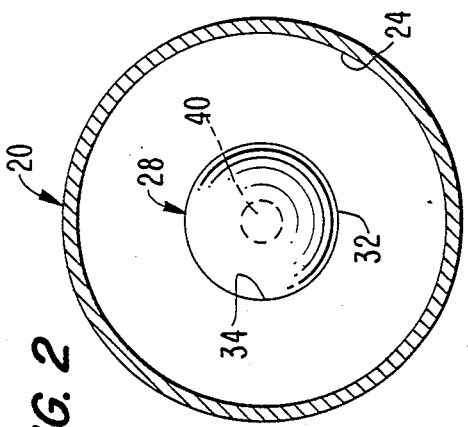
FIG. 2 is a sectional view taken on line 2—2 of FIG. 1, and looking in the direction of the arrows.
Figure 4:
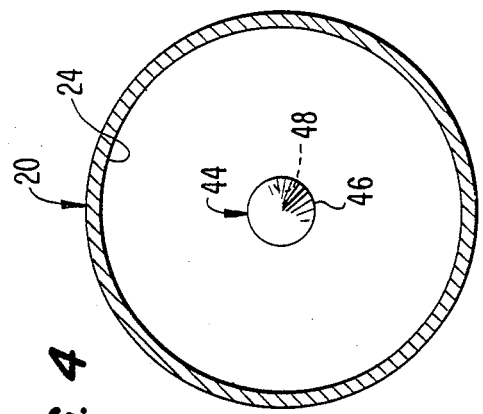
FIG. 4 is a sectional view taken on line 4—4 of FIG. 3; and looking in the direction of the arrows.
Figure 3:
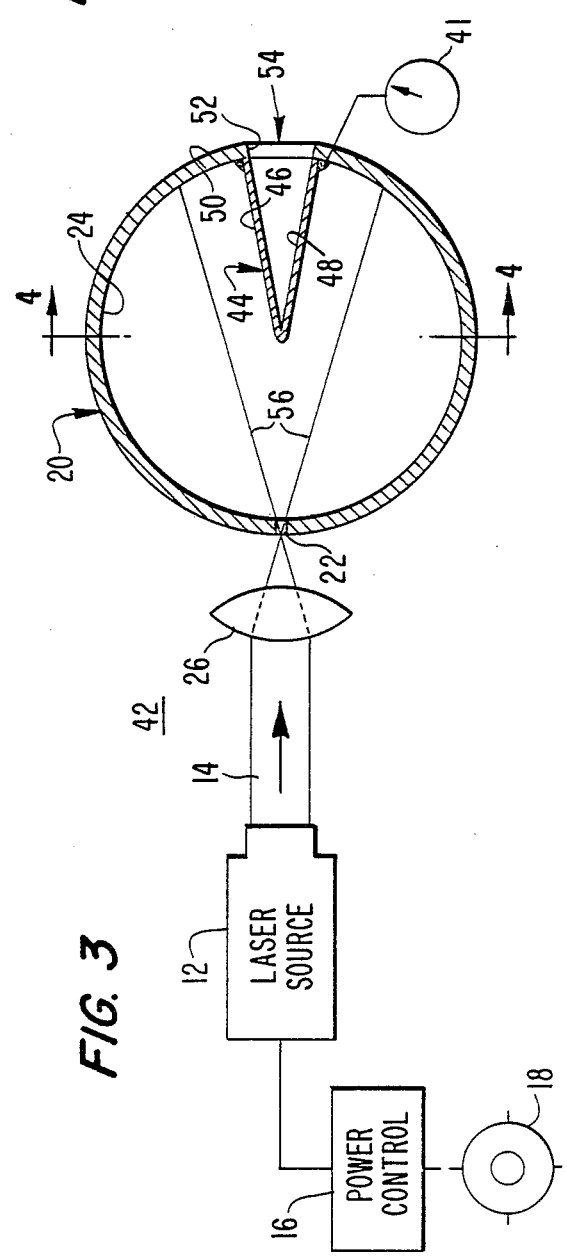
FIG. 3 is a schematic representation of an apparatus in accordance with another present preferred embodiment of the invention, illustrating in cross section the specular integrating sphere and source cavity thereof.

Referring to FIGS. 3 and 4, where like reference numerals refer to like portions of the apparatus of the embodiment of FIGS. 1 and 2, reference numeral 42 refers generally to an apparatus for generating polychromatic Planckian radiation from a monochromatic laser source in accordance with another embodiment of the invention. Similar to the embodiment of FIGS. 1 and 2, spherical member 20 has an entrance aperture 22 for admitting a focused laser beam 14 from lens 26 to specularly integrate on inner mirrored surface 24. Disposed in member 20 is a radiation absorbtive means or second chamber means 44, which is conical in configuration and has a wall 45 with radiation absorbent exterior and interior surfaces 46 and 48, respectively. Cone 44 has an open base portion axially aligned with entrance aperture 22. Cone 44 is attached at peripheral edge 50 of the base portion, such as by brazing to inner surface 24 surrounding aperture 52 of member 20 to form output aperture 54. Exterior surface 46 of conical member 44 is completely enclosed in hollow member 20, the same as spherical member 28 of FIGS. 1 and 2.

In accordance with the principles of the present invention, the ratio of the diameter of entrance aperture 22 to the diameter of integrating sphere member 20 is extremely small, such as in the neighborhood of one to two hundred-fifty, which results in absorbtivity by external surface 32 or 46, as the case may be, and interior surface 24 that is very nearly 1.0, or in other words, practically 100% of the laser energy introduced through entrance aperture 22 is absorbed. To provide uniformity of output radiation at aperture 40 or 54, spherical member 28 and conical member 44, should be of such dimension that they are positioned within the laser cone referenced by numeral 56.

In keeping with the principles of the present invention, the total absorbtivity of exterior surface 32 of sphere 28, or exterior surface 46 of cone 44, as the case may be, is substantially greater than the total absorbtivity of interior surface 24 of specular integrating sphere 20 such that the respective source cavity, whether sphere or cone, will absorb the majority of the laser energy entering aperture 22 from source 12 through lens 26. The absorbed laser energy heats wall 29 of the sphere 28 or cone 44 until the power absorbed is equal to the power radiated as heat through output aperture 40 and 54, respectively.

In accordance with the present invention, the radiation absorptive or second chamber means and the output aperture means are dimensioned relative to each other to provide polychromatic radiation having an emissivity which is a predetermined percentage of that required for Planckian radiation in response to the laser radiation in the first chamber means. With reference to the embodiment of FIGS. 1 and 2, it has been determined that if the ratio of the diameter of sphere 28 to the diameter of output aperture 40 is approximately four to one, the emissivity of the apparatus is approximately ninety-four percent. If this ratio is increased to ten to one, the emissivity of the output approaches ninety-nine percent. To obtain similar emissivity with the embodiment illustrated in FIGS. 3 and 4, the ratio of the length of cone 44 to the area of output aperture 54 is approximately fifteen to one.

Thus, there has been described an apparatus for carrying out a method of converting monochromatic laser radiation to polychromatic radiation in accordance with the present invention that comprises focusing a laser beam 14 by optics 26 through an aperture 22 to a reflective interior 24 of an enclosed chamber 20 for specularly integrating the laser radiation; absorbing the integrated radiation through a defined cavity 28,44 having external surface 32,46 within enclosed chamber 20 wherein cavity 28,44 has a mouth 40,54 communicating with the exterior of chamber 20 with a dimension relative to surface area 32,46 to convert the absorbed radiation to polychromatic radiation having an emissivity of approximately ninety-four percent of unity; and varying the power at control 16 of the laser source 12 by manipulating dial 18 to control the temperature, which may be indicated at 41, of the absorbing surface area for producing corresponding wavelengths at the cavity mouth.

Under laboratory conditions, an apparatus according to the embodiment of FIGS. 1 and 2 having a mouth 40 diameter of 0.5 cm, a wall 29 thickness of 0.1 cm, and a sphere 28 diameter of 2.5 cm, when constructed of grahite, can be heated by a 25 watt laboratory laser at approximately 2.4° Kelvin per second. Such apparatus will continue to heat until a temperature of approximately 1,000° Kelvin is reached. With room temperature at 300° K., a 700° K. temperature increase occurs in approximately 4.9 minutes. With the application of 100 watts of laser power to the same apparatus, a temperature use rate of approximately 10° Kelvin per second is effected. Greater increases, of course, may be accomplished by utilizing higher powered lasers, or decreasing the relative size and mass of the radiation source.

It will be apparent to those skilled in the art that various modifications and variations can be made in the polychromatic radiation generating apparatus of the present invention without departing from the spirit or scope of the invention. Thus, it is intended that the present invention cover the modifications and variations of the invention provided they come within the scope of the appended claims and their equivalents.

What I claim is:

1. An apparatus for generating infrared and near infrared radiation, comprising a hollow member having entrance aperture means, output aperture means, for emitting a source of infrared and near-infreared radiation and an internal reflective surface portion for specularly integrating monochromatic laser radiation entering said hollow member through said entrance aperture means; radiation absorptive means mounted within said member for forming a cavity surrounding said output aperture means and for absorbing laser energy from said hollow member, said absorptive means having a total absorbtion of said laser radiation substantially greater than said reflective internal surface and having a surface area dimensioned relative to said output aperture means to provide infrared and near-infrared radiation having a selected emissivity upon the absorption of integrated laser radiation in said cavity.

2. An apparatus according to claim 1 wherein said hollow member is spherical in configuration.

3. An apparatus according to claim 1 wherein said radiation absorptive means is comprised of a structure generally spherical in configuration.

4. An apparatus according to claim 1 wherein said radiation absorptive means is comprised of a structure generally conical in configuration.

5. An apparatus according to claim 1 wherein the relative dimension of the output aperture and radiation absorptive means is selected for generating a radiation output having an approximate emissivity corresponding to Planckian radiation.

6. An apparatus according to claim 1 where the relative dimension of the output aperture and radiation absorptive means is in the range of approximately 94% to 99%.

7. An apparatus for generating infrared and near infrared radiation, comprising first chamber means having entrance aperture means and a second aperture means, for emitting a source of infrared and near-infrared radiation said first chamber means having a reflective surface for specularly integrating monochromatic laser radiation entering said first chamber through the entrance aperture means; a second chamber means having a third aperture means disposed within said first chamber means, said second chamber means having an absorptive external and internal surface for absorbing laser energy in said first chamber means, said exterior surface of said second chamber means surrounding said third aperture means being attached to said surface of said first chamber means surrounding the second aperture means for enclosing the external surface of the second chamber means in the first chamber means and to form an output aperture for effecting communication of said interior of the second chamber means externally of said first chamber means; said second chamber means and said output aperture means being dimensioned relative to each other to provide infrared and near infrared radiation emissivity substantially corresponding to Planckian radiation upon absorption of integrated laser radiation in said second chamber means.

8. An apparatus according to claim 7 wherein said first chamber means is spherical in configuration.

9. An apparatus according to claim 8 wherein said second chamber means is spherical in configuration.

10. An apparatus according to claim 8 wherein said second chamber means is conical in configuration.

11. An apparatus according to claim 9 wherein the ratio of the diameter of said second chamber means to said output aperture means is approximately four to one.

12. An apparatus according to claim 9 wherein the ratio of the diameter of said second chamber means to said output aperture means is approximately ten to one.

13. An apparatus according to claim 8 further comprising a laser source, means for focusing the laser source to converge a laser beam in said entrance aperture, means for varying the power of said laser source, and means for detecting the temperature of said second chamber means 14. A method of converting monochromatic laser radiation to infrared and near-infrared radiation, comprising focusing a laser beam through an aperture to a reflective interior of an enclosed chamber for specularly integrating the laser radiation; absorbing the integrated radiation through a cavity forming surface area within the enclosed chamber having a mouth communicating exteriorly of the chamber with a dimension relative to the surface area to convert the absorbed laser radiation to infrared and near-infrared radiation having a selected emissivity and varying the power of the laser radiation to control the temperature of the absorbing surface area for producing corresponding wavelengths at the cavity mouth.

* * * * *

UNITED STATES PATENT AND TRADEMARK OFFICE
CERTIFICATE OF CORRECTION

PATENT NO. : 4,789,788

DATED : December 6, 1988

INVENTOR(S) : Philip R. Cox

It is certified that error appears in the above-identified patent and that said Letters Patent is hereby corrected as shown below:

Column 1, before "BACKGROUND OF THE INVENTION" insert the following paragraph:

> The U.S. Government has a paid-up license in this invention and the right in limited circumstances to require the patent owner to license others on reasonable terms as provided for by the terms of Contract No. DASG60-85-C-0101 awarded by the Department of the Defense.

Signed and Sealed this

Thirteenth Day of February, 1990

*Attest:*

JEFFREY M. SAMUELS

*Attesting Officer*  *Acting Commissioner of Patents and Trademarks*